US008984616B2

(12) United States Patent
Jamrog et al.

(10) Patent No.: US 8,984,616 B2
(45) Date of Patent: Mar. 17, 2015

(54) EFFICIENT ROUTING FOR REVERSE PROXIES AND CONTENT-BASED ROUTERS (75) Inventors: Daniel M Jamrog, Westford, MA (US); David Scott Kern, Billerica, MA (US); Jason Dana LaVoie, Littleton, MA (US); Chester E Ryder, III, Dracut, MA (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 12/962,949

(22) Filed: Dec. 8, 2010

(65) Prior Publication Data
US 2012/0151204 A1    Jun. 14, 2012

(51) Int. Cl.
G06F 9/00 (2006.01)
G06F 15/16 (2006.01)
G06F 17/00 (2006.01)
G06F 15/173 (2006.01)
H04L 29/06 (2006.01)
H04L 29/08 (2006.01)

(52) U.S. Cl.
CPC ........ H04L 63/0815 (2013.01); H04L 63/0281 (2013.01); H04L 67/2819 (2013.01)
USPC ............. 726/12; 713/152; 713/182; 709/225; 709/227; 709/228

(58) Field of Classification Search
CPC ....... H04L 67/02; H04L 67/14; H04L 67/146; H04L 69/32; H04L 69/329
USPC ...................... 726/1–4, 26–302; 709/223–229
See application file for complete search history.

(56) References Cited

U.S. PATENT DOCUMENTS

| | | |
|---|---|---|
| 5,946,680 A | 8/1999 | Shorter et al. |
| 6,415,323 B1 | 7/2002 | McCanne et al. |
| 6,578,066 B1 | 6/2003 | Logan et al. |
| 6,816,457 B1 | 11/2004 | Bahattab |
| 6,885,388 B2 | 4/2005 | Gunter et al. |
| 7,058,718 B2 * | 6/2006 | Fontes et al. .................. 709/228 |
| 7,334,257 B1 * | 2/2008 | Ebrahimi et al. ................. 726/3 |
| 7,376,827 B1 | 5/2008 | Jiao |
| 7,526,799 B2 * | 4/2009 | Birk et al. ........................ 726/9 |

(Continued)

OTHER PUBLICATIONS

USPTO and LaVoie; examination correspondence from related U.S. Appl. No. 12/485,653, filed Jun. 16, 2009, by Jason LaVoie, et al.

(Continued)

*Primary Examiner* — Tae Kim
(74) *Attorney, Agent, or Firm* — Robert H. Frantz; Parashos T. Kalaitzis (57) ABSTRACT

Efficient routing for a client-server session or connection is provided in an application layer of multi-layered systems interconnect stack by caching a plurality of application-specific information at an intermediary network point; using the application specific information to route messages for an application connection; and indexing the application-specific information with a key provided by the application. Optionally, a second key may be used to retrieve the application-specific information if the first key is not provided in an application connection request, where the second key is optionally opaque to the application program. The intermediary network point may be an edge of network Internet Protocol (IP) switch, and the application layer in which the routing is performed may be layer seven of the Open Systems Interconnection model.

14 Claims, 8 Drawing Sheets

(56) References Cited

U.S. PATENT DOCUMENTS

| | | | |
|---|---|---|---|
| 7,552,210 B1 | 6/2009 | Blum et al. | |
| 7,634,803 B2* | 12/2009 | Birk et al. | 726/8 |
| RE42,892 E | 11/2011 | Montulli | |
| 8,176,161 B2 | 5/2012 | LaVoie et al. | |
| 8,219,802 B2 | 7/2012 | Doleh et al. | |
| 2002/0062372 A1* | 5/2002 | Hong et al. | 709/225 |
| 2002/0112155 A1 | 8/2002 | Martherus et al. | |
| 2002/0199014 A1 | 12/2002 | Yang et al. | |
| 2003/0039249 A1* | 2/2003 | Basso et al. | 370/394 |
| 2003/0099237 A1* | 5/2003 | Mitra et al. | 370/393 |
| 2003/0135625 A1* | 7/2003 | Fontes et al. | 709/228 |
| 2003/0236977 A1 | 12/2003 | Levas et al. | |
| 2004/0044768 A1 | 3/2004 | Takahashi | |
| 2004/0123140 A1 | 6/2004 | Toomey | |
| 2005/0091244 A1 | 4/2005 | Marcotte | |
| 2006/0005234 A1* | 1/2006 | Birk et al. | 726/9 |
| 2006/0015727 A1* | 1/2006 | Birk et al. | 713/171 |
| 2006/0021016 A1* | 1/2006 | Birk et al. | 726/10 |
| 2006/0036875 A1 | 2/2006 | Karoubi | |
| 2006/0101507 A1 | 5/2006 | Camenisch | |
| 2006/0156387 A1 | 7/2006 | Eriksen | |
| 2006/0230265 A1 | 10/2006 | Krishna | |
| 2006/0277594 A1 | 12/2006 | Chiavegatto et al. | |
| 2006/0277596 A1* | 12/2006 | Calvert et al. | 726/3 |
| 2007/0002869 A1* | 1/2007 | Miller | 370/395.32 |
| 2007/0106815 A1 | 5/2007 | Harvey et al. | |
| 2007/0112789 A1 | 5/2007 | Harvey et al. | |
| 2007/0112877 A1 | 5/2007 | Harvey et al. | |
| 2007/0226294 A1 | 9/2007 | Pruitt et al. | |
| 2007/0226358 A1 | 9/2007 | Krywaniuk | |
| 2007/0234408 A1* | 10/2007 | Burch et al. | 726/6 |
| 2008/0244719 A1 | 10/2008 | Hariya et al. | |
| 2008/0307438 A1 | 12/2008 | Creamer et al. | |
| 2009/0150485 A1* | 6/2009 | Kawabata et al. | 709/203 |
| 2009/0182843 A1* | 7/2009 | Hluchyj et al. | 709/219 |
| 2009/0249440 A1 | 10/2009 | Platt et al. | |
| 2009/0254978 A1 | 10/2009 | Rouskov et al. | |
| 2009/0282239 A1 | 11/2009 | Doleh | |
| 2010/0024012 A1* | 1/2010 | Devine et al. | 726/5 |
| 2010/0107234 A1 | 4/2010 | Aldor et al. | |
| 2010/0145960 A1 | 6/2010 | Casteel et al. | |
| 2010/0235522 A1* | 9/2010 | Chen et al. | 709/228 |
| 2010/0263030 A1 | 10/2010 | Dawson et al. | |
| 2010/0299406 A1 | 11/2010 | Murata | |
| 2010/0318679 A1 | 12/2010 | LaVoie et al. | |
| 2010/0319068 A1 | 12/2010 | Abbadessa et al. | |
| 2012/0005738 A1* | 1/2012 | Manini et al. | 726/7 |
| 2012/0291141 A1 | 11/2012 | Doleh et al. | |

OTHER PUBLICATIONS

TCPIPGuide; "Presentation Layer (Layer 6)", retrieved from http://www.tcipiguide.com/free/t_PresentationLayerLayer6.html on Feb. 12, 2013.

TCPIPGuide; "Application Layer (Layer 7)", retrieved from http://www.tcipiguide.com/free/t_ApplicationLayerLayer7.html on Feb. 12, 2013.

USPTO; Examination Correspondence from a Related U.S. Appl. No. 13/090,511, filed Apr. 20, 2011 by Jason D. LaVoie.

Cisco, "Documentation Guide for Cisco AON 3.0", retrieved on Jul. 22, 2014 from http://www.cisco.com/c/en/us/td/docs/net_mgmt/application_oriented_networking/3-0/roadmap/aon_30_docguide.html.

* cited by examiner

EFFICIENT ROUTING FOR REVERSE PROXIES AND CONTENT-BASED ROUTERS

CROSS-REFERENCE TO RELATED APPLICATIONS

Claiming Benefit Under 35 U.S.C. 120

None.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

U.S. patent application Ser. No. 12/485,653, filed by Jason D. LaVoie et al., on Jun. 16, 2009, entitled "METHOD AND SYSTEM FOR CONTENT-BASED ROUTING OF NETWORK TRAFFIC", is hereby incorporated by reference in its entirety, including figures.

FIELD OF THE INVENTION

The invention generally relates to technologies for associating users of remote computer systems with a plurality of server systems while efficiently making user-specific data available to the server system.

BACKGROUND OF INVENTION

There are several general architectures of servers in networks which provide services to users of remote terminals, devices, and web browsers. A fundamental requirement for such arrangements is for user-specific data, such as a user's account information, to be made available to a particular application server computer selected from a group of application servers in the network. One such approach is to replicate all user data to all applications servers. A drawback of this approach is the cost and size of the data storage footprint, the inability to scale the solution well, and the complexity of managing such an environment.

A alternative to this approach is to manually break a networked computing environment into clusters, where the client device is directly configured to connect with a particular cluster. This is an adequate solution for certain environments such as on closed networks with thick clusters. However, this approach does not lend itself to the more advanced model of cloud or thin-client computing. Management of the clusters becomes costly.

Another approach has been to have database servers act as "backend" databases, where all database servers are networked to all application servers so that the user-specific data does not have to be replicated, it is simply accessed from the selected application server over the network. This latter solution avoids replication, but is notably more complex to configure, maintain, and significantly more expensive in many realizations.

Content-based routers, or so-called layer-seven routers, provide a split connection proxy to direct user computers to particular application servers in a network by terminating a Transmission Control Protocol/Internet Protocol (TCP/IP) connection between the user computer and the content-based router, and establishing a new TCP/IP connection between the content-based router and the selected back-end server, typically routing hyper text transfer protocol (HTTP) page requests to the selected application server and responses from the server back to the user computer. As such, content-based routers can be viewed as specialized layer-seven routers, where the term "layer-seven" generally refers to the Open Systems Interconnection (OSI) seven-layer model promulgated in International Standards Organization (ISO) standard number 7498, which is described in more detail in the following paragraphs under "Open Systems Interconnection Models".

Reverse proxies and content-based routers can distribute ("spray") connections and sessions using many different methods to a plurality of back-end application servers, but generally speaking, once a connection is established between a user computer and an application server, the user computer is affinitized to a specific application server. This has the aforementioned drawback in that when the user-specific application data is stored directly on the application servers (versus being stored by a back-end database), the user-specific data must be replicated to every server or must be replicated to each server as needed.

In another patent application filed Jun. 16, 2009, now U.S. Ser. No. 12/485,653, a method for real-time look-ups to route users to specific back-end servers has been described in order to solve this issue. However, there remains a limitation of increased delay for the look-ups, as well as increased cost by deploying more servers.

SUMMARY OF THE INVENTION

Efficient routing for a client-server session or connection is provided in an application layer of multi-layered systems interconnect stack by caching a plurality of application-specific information at an intermediary network point; using the application specific information to route messages for an application connection; and indexing the application-specific information with a key provided by the application. Optionally, a second key may be used to retrieve the application-specific information if the first key is not provided in an application connection request, where the second key is optionally opaque to the application program. The intermediary network point may be an edge of network Internet Protocol (IP) switch, and the application layer in which the routing is performed may be layer seven of the Open Systems Interconnection model.

BRIEF DESCRIPTION OF THE DRAWINGS

The description set forth herein is illustrated by the several drawings.

DETAILED DESCRIPTION OF EMBODIMENT(S) OF THE INVENTION

The inventors of the present invention have recognized a problem not previously recognized or addressed by those ordinarily skilled in the art. In particular, the inventors have recognized that delay for routing look-up operations in reverse proxies and content-based routers are unnecessarily long, and that the cost of server deployment is unnecessarily high due to the approaches described in the background of the invention.

To address this problem in the art using a different approach than those previously taken, the inventors have built a layer-seven routing table in an Internet Protocol (IP) switch. After a look-up operation is performed on behalf of a new user (at the beginning of a new session), the routing information is stored in the IP switch. Subsequent requests from that user are routed appropriately according to the routing information stored in the IP switch, rather than having to look it up again from another source or server.

For large hosting environments using co-located application and data, users are directed to a specific set of servers. This is done via a look-up on the inbound request, such as is described in the related patent application, which is incorporated by reference to the present patent application. There is a cost associated with performing a look-up on every new request, especially with long running user sessions. The new method employs caching the routing state at the IP switch.

While those ordinarily skilled in the art will readily recognize that caching, in general, is not new, several technical hurdles had to be overcome for the inventors' approach to be operational, the solutions to which were not readily apparent or obvious. In particular:
  (a) After user authentication, new session information is retrieved from the person directory. This information is then stored (cached) in local memory on the IP switch.
  (b) The user's devices are each given a unique key into the cached routing information table. For HTTP users, this is in the form of a cookie. The employed Uniform Resource Locators (URLs) are pointed to the actual application servers, and are not shared with users or their devices in multi-tenant environments.
  (c) User devices are also given a "secondary cookie". This is a private encrypted cookie containing the data required to look-up a user again without requiring a login or re-authentication. This secondary cookie is used in the event the IP switch loses power or fails over or the session cookie is removed. Only the creator of the cookie (the authentication mechanism in this case) can decrypt the cookie. The cookie can be decrypted by any available back end authentication server.

These three solutions form the core of embodiments according to the invention, with the secondary cookie being somewhat optional, albeit omission of the secondary cookie in the absence of a replacement failure recovery mechanism being ill advised in many situations.

Open Systems Interconnection Models

The present invention will be described with reference to one or more exemplary embodiments which are compliant with the Open Systems Interconnection (OSI) model promulgated by the International Organization for Standardization (ISO). This well-known interconnection model provides seven layers of functions, where the functions within a layer are conceptually similar to each other: Layer one is the Physical Layer, layer two is the Data Link Layer (including the Wide Area Network (WAN) Protocol and Local Area Network (LAN) protocols), layer three is the Network Layer, layer four is the Transport layer; layer five is the Session Layer; layer six is the Presentation Layer; and layer seven is the Application Layer.

For purposes of illustrating the invention, the following example embodiments will be provided relative to this seven-layer model. It will be understood by those ordinarily skilled in the art, however, the present invention may be realized in conjunction or compliant with other communications protocol stacks and models.

Further, the reader is cautioned to distinguish between client-server "sessions", which are the set of communications between a client device and a server computer for the duration of transaction or interaction between the two, and the session layer of the OSI model. These are distinctly different uses of the term "session".

Overview of the Related Patent Application

The related patent application operates in a client-server environment, the router performing a look-up to determine which backend server to go to among a plurality of servers. However, in the related patent application, instead of replicating all user-specific data to all M application servers in the network, data storage is minimized by only copying the user-specific data to N application servers, where N<M. So, according to this related patent application, the routing method is enhanced to select an application server from the subset of servers which already have the particular user's data stored on it.

Overview of the Present Enhancement

The present invention goes beyond the well-known method of caching at the router. The present invention provides a performance enhancement to the system and method disclosed in the related patent application by taking that modified routing information—e.g. the routing to the N subset of servers according to the user-specific data storage location—and storing (caching) it in the router. Then, the present invention provides a method to use that information in routing decisions for each subsequent Transmission Control Protocol/Internet Protocol (TCP/IP) connection. Normally, routers only have context for the length of each TCP/IP connection, and do not retain context across different TCP/IP connections. So, the present invention provides a mechanism to address that limitation of standard (unimproved) routers. To accomplish this, a cookie is created for each application layer or HTTP session, which is then utilized during subsequent interactions between the same user device and the applications server to index into the cached routing information.

Further, to enhance the reliability of this new routing method, a secondary cookie is also provided to the user device during session initialization. This was provided in new method in order to recover context of a previously-established session, such as when the context is lost by the browser device or by the router device, in order to avoid re-initializing a session (e.g. re-authenticating, creating a new primary cookie, etc.). Web browsers are especially susceptible to losing cookies, whether by software error or by normal operation of various protection products such as anti-phishing and antispyware products. These types of security products often delete or quarantine cookies that they determine to be suspect, which can hamper normal, non-malicious operation of web-based applications. The secondary cookie of the present invention is useful in dealing with this likely problem during operation of embodiments of the invention.

According to one available embodiment of the invention, only one computer, for example the authentication server, is encrypting and decrypting the secondary cookie. So, rather than have to use more complex encryption schemes such as Public Key Infrastructure (PKI) or browser encryption methods, this embodiment of the invention may use any encryption/decryption scheme which is deemed suitable by the system designer and installer and supported by the authentication server. In a variation embodiment, the enhanced router may also be provided with the decryption process to decrypt the secondary cookie.

Logical Process According to the Invention

Figure 1:
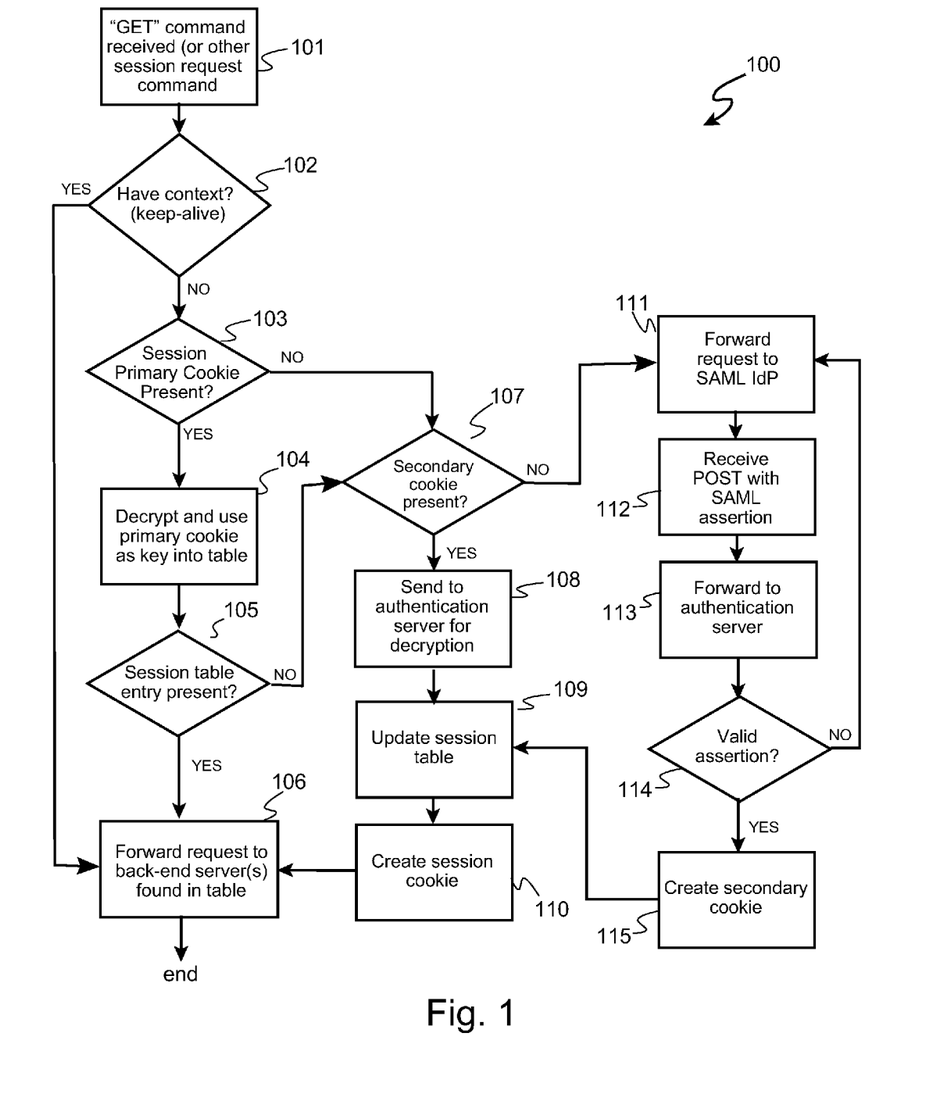
FIG. 1 sets forth a logical process for routing messages in an application layer of a communications stack according to the invention.

Turning to FIG. 1, a logical process (100) according to the present invention is shown, using Hyper Text Transfer Protocol (HTTP) commands. This logical process is suitable for embodiment in a program executed by a computing platform, and may be realized in some embodiments in part or whole in circuitry such as an integrated circuit or programmable logic device. In particular, this logical process is implemented on an intermediary network point, such as an edge of network Internet Protocol (IP) switch, a reverse proxy device, or a content-based router.

Responsive to receipt (101) of a "GET" HTTP command, it is determined (102) if context already exists for this client-server session or connection. If so, then the process has already been completed, and it ends. If not, then it is determined (103) if a session cookie is already present.

If a session cookie is already present, then it is locally decrypted (104), and the session table is searched to see if a corresponding entry is already present (105). If the entry is found, then it is used to direct the GET request to the appropriate back-end server (106).

However, if no session table entry is found corresponding to the decrypted session cookie, then the session context may have been lost, so a check is made (107) to determine if a secondary cookie is present. If it is, then it is passed to an authentication server for decryption (to recover the session context), preferably using an HTTP request and response. Next, the session table is updated (109), and a new session cookie is created (110) to correspond to the updated entry in the session table. Then, the entry in the session table is used to direct the GET request to the appropriate back-end server (106).

If no secondary cookie is found (107), then a request (111) is made for new authentication, preferably using Security Assertion Markup Language (SAML) to an Identity Provider of assertions (IdP), and receiving the new assertion (112). This is forwarded (113) to the authentication server, and if valid (114), a secondary cookie is created (115). If the assertion is not valid (114), then the process to obtain a new assertion (111-114) is repeated.

Logical Interaction Sequence Diagrams

The logical process of FIG. 1 can be understood in more detail by referring to the logical interaction diagrams provided in FIGS. 2 through 7.

Figure 2:
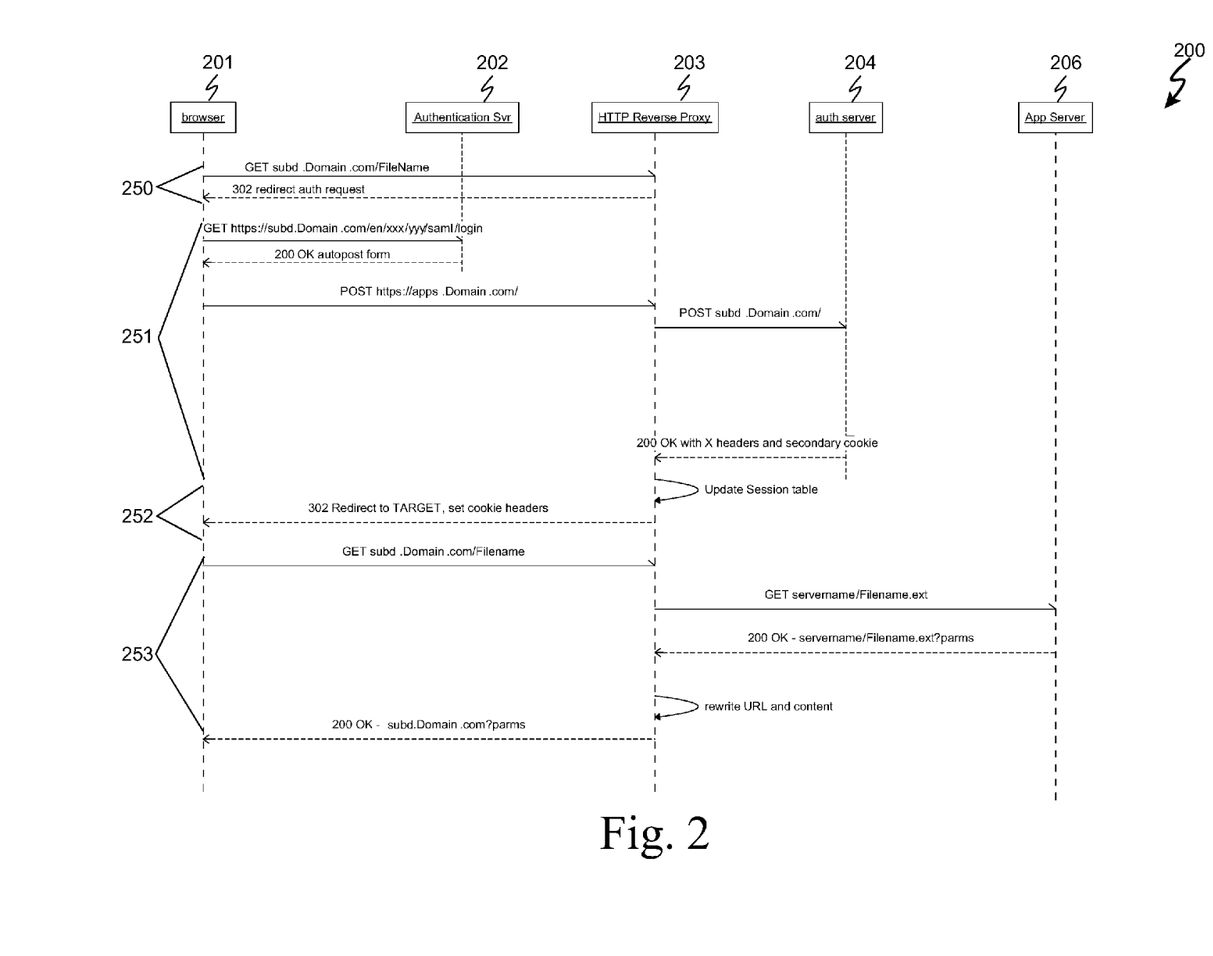
FIG. 2 illustrates a logical interaction sequence to obtain certain data prior to performing the logical process of FIG. 1.

Turning to FIG. 2, the logical interaction sequence (200) to obtain certain data prior to performing the logical process of FIG. 1 is shown. This sequence is the subject of the related patent application, and is provided here as background information, but it is not disclaimed as prior art. In this example, access to an application server (206) by a browser (201) is required, but there are multiple application servers (others not show) which may be targeted. The present invention streamlines the selection and routing to a particular application server.

In subsequence 250, a browser (201) attempts to do something with a server (e.g. makes an application server request), such as sending GET, POST HEAD, and OPTIONS HTTP commands. This is received by an HTTP Reverse Proxy Server (203), but in this example, the session is new, and there are no cookies or SAML established yet for this user or browser (201). So, in subsequence 251, authentication is performed by an authentication server or service, the reverse proxy server (203), an the authentication server (204).

In subsequence 252, the session table, which is cached by the IP router, is updated to contain an appropriate entry for redirection, and in subsequence 253, access to a particular application server (206) from provided by routing messages between the browser (201) and the application server (206) using the session entry for routing in the session table which is cached at the IP router.

Figure 3:
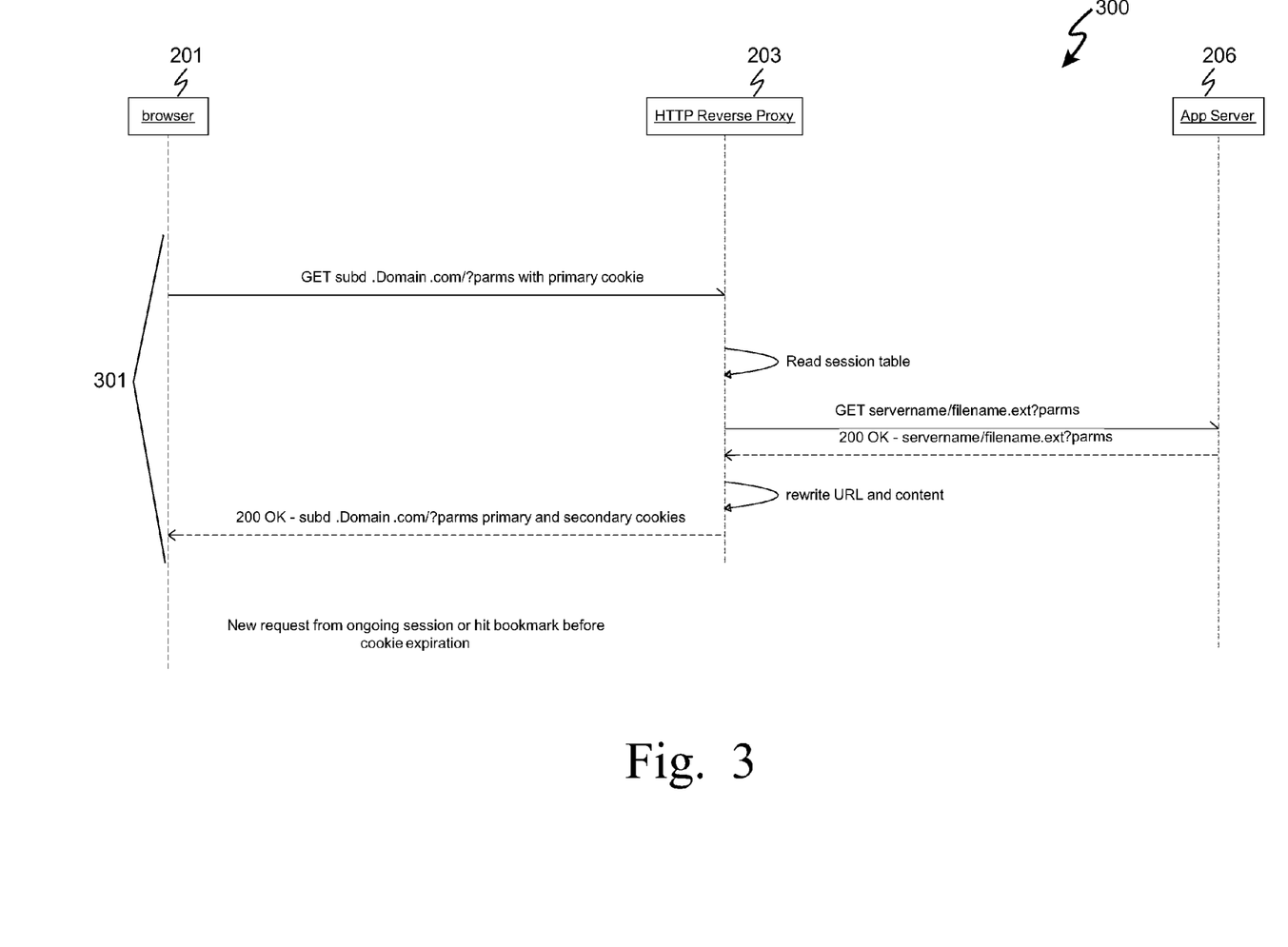
FIG. 3 shows a logical interaction sequence for a scenario in which a new request is received from a browser in an on-going (already established) session.

In FIG. 3, a logical interaction sequence (300) is shown for a scenario in which a new request is received from a browser in an on-going (already established) session. As can be seen from this sequence (301), the session table is used as previously described to efficiently route the GET commands to application server without delay or authentication.

Figure 4:
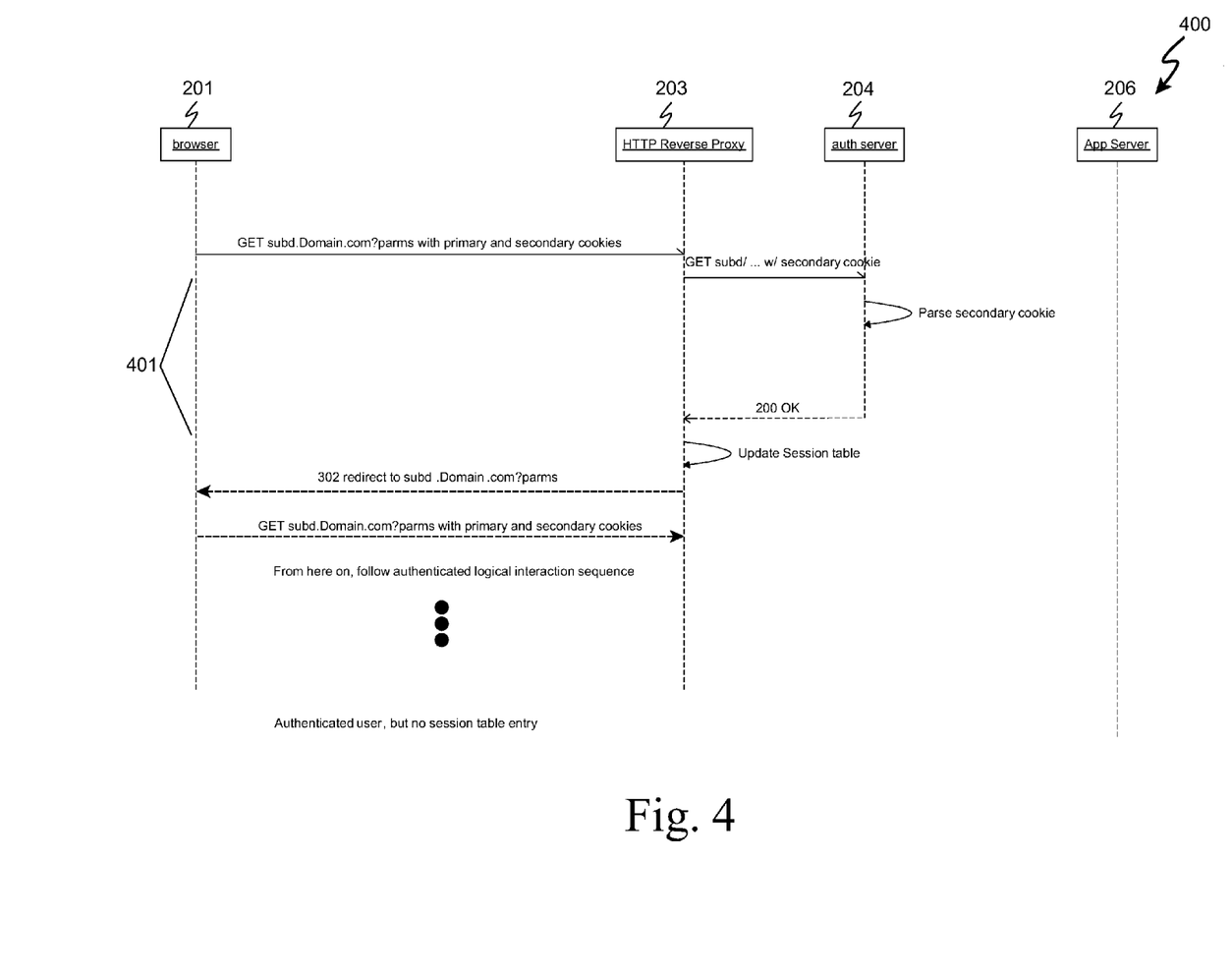
In FIG. 4 provides a logical interaction sequence for a similar scenario to that of FIG. 3, but in this variation, the session cookie is missing, so subsequence utilizes the secondary cookie to recover the session context and to update the session table appropriately.

In FIG. 4, a similar scenario to that of FIG. 3 is shown (400), but in this variation, the session cookie is missing, so subsequence 401 utilizes the secondary cookie to recover the session context and to update the session table appropriately. Otherwise, all other sequencing is similar to the foregoing sequences.

Figure 5:
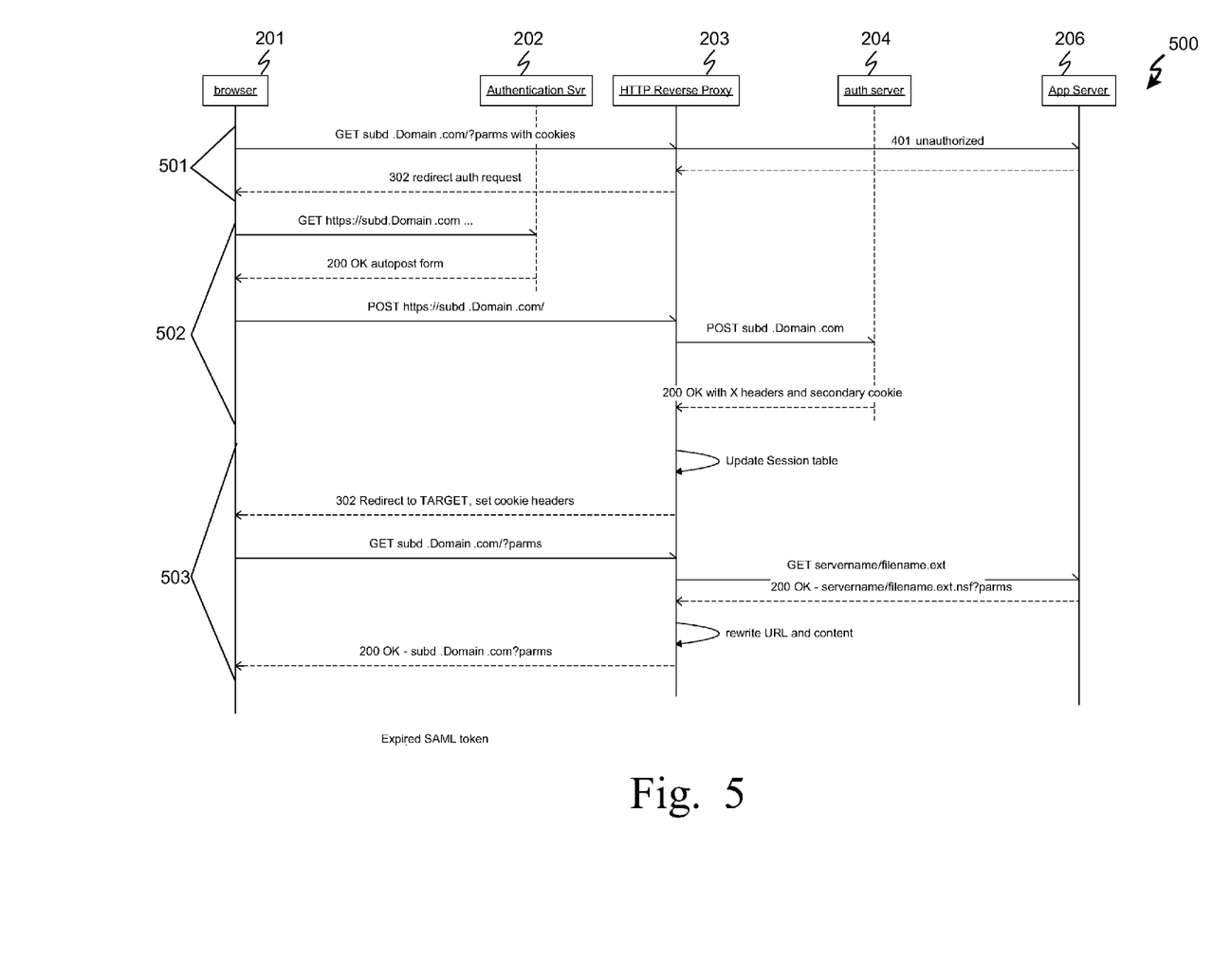
FIG. 5 depicts a logical interaction sequence in which the authentication token is expired.

In FIG. 5, a sequence (500) in which the authentication token is expired is illustrated (501). In such a situation, a new authentication assertion is obtained (502), before proceeding in the same manner (503) as previously described.

Figure 6:
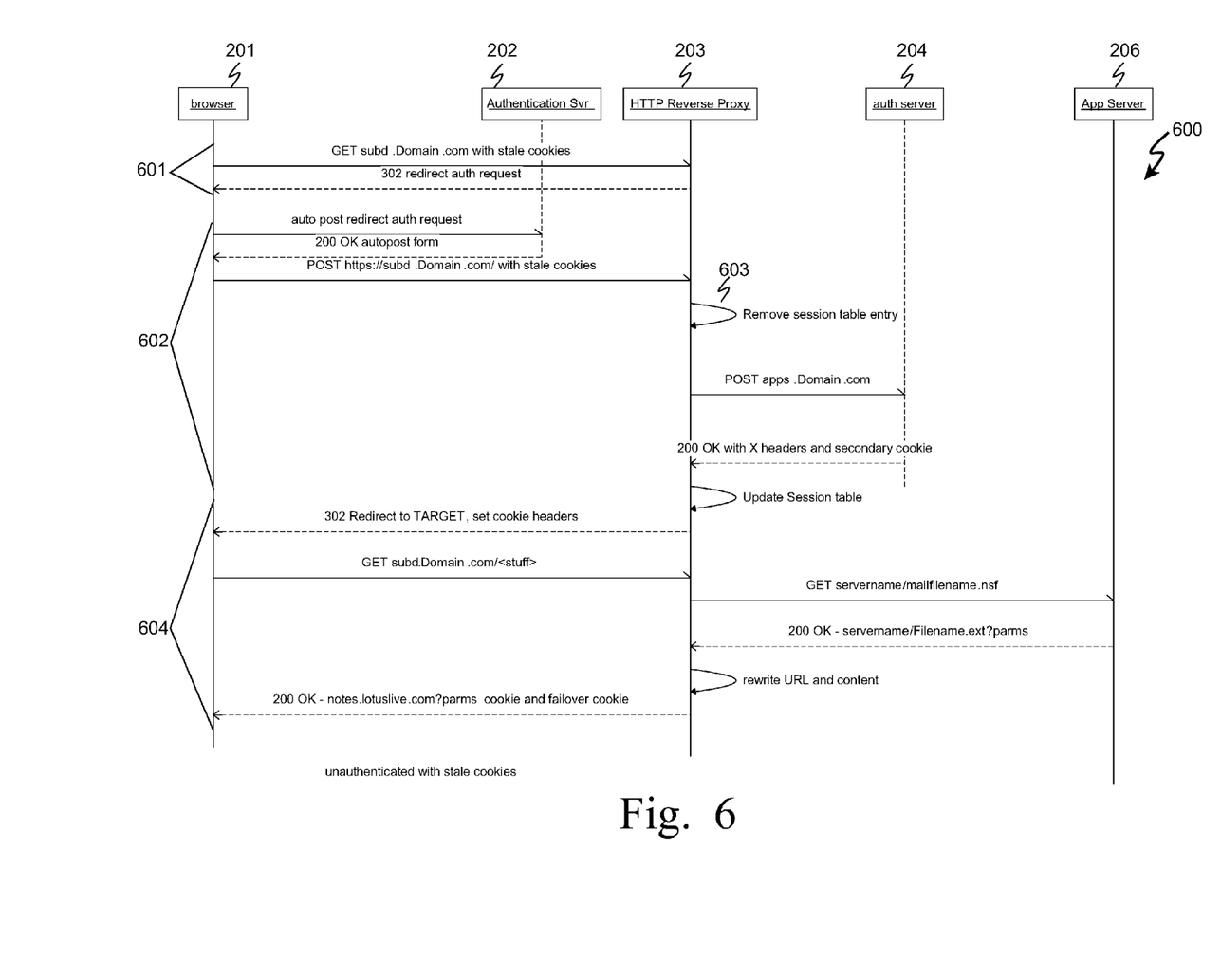
FIG. 6 sets forth a logical interaction sequence in which there are cookies associated with the session request, but the cookies are stale (e.g. unauthenticated).
Figure 7:
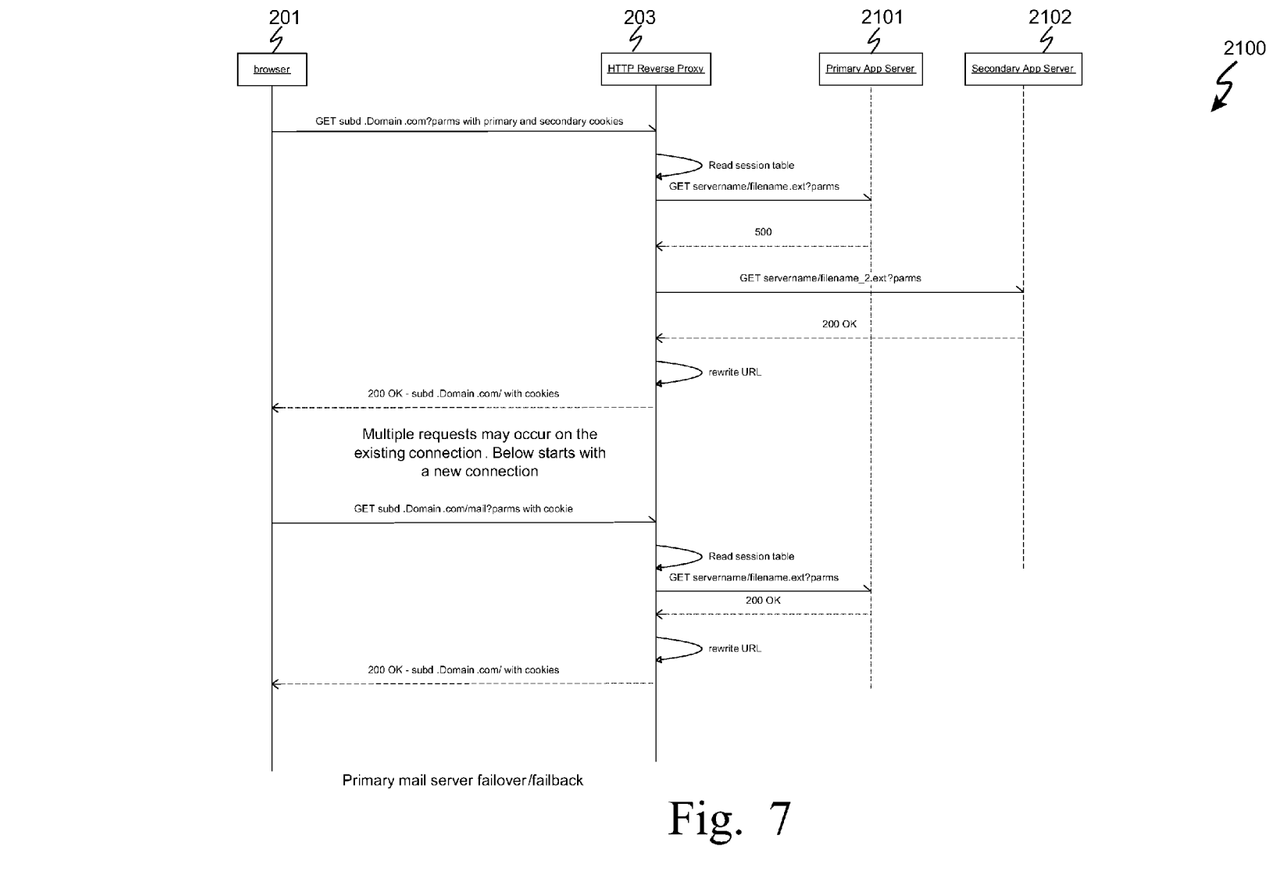
FIG. 7 illustrates a logical sequence during which the primary application server returning an error.

FIG. 6 sets forth a sequence (600) which is interesting for scenarios in which there are cookies associated with the session request (601), but the cookies are stale (e.g. unauthenticated). This scenario includes a re-authentication subsequence (602) which is modified to include removal (603) of the session table entry associated with the stale cookie. New cookies are established, and routing proceeds as previously described (604). And in FIG. 7, a logical interaction sequence (2100) is shown for responding to an application server failure.

Suitable Computing Platform

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 8:
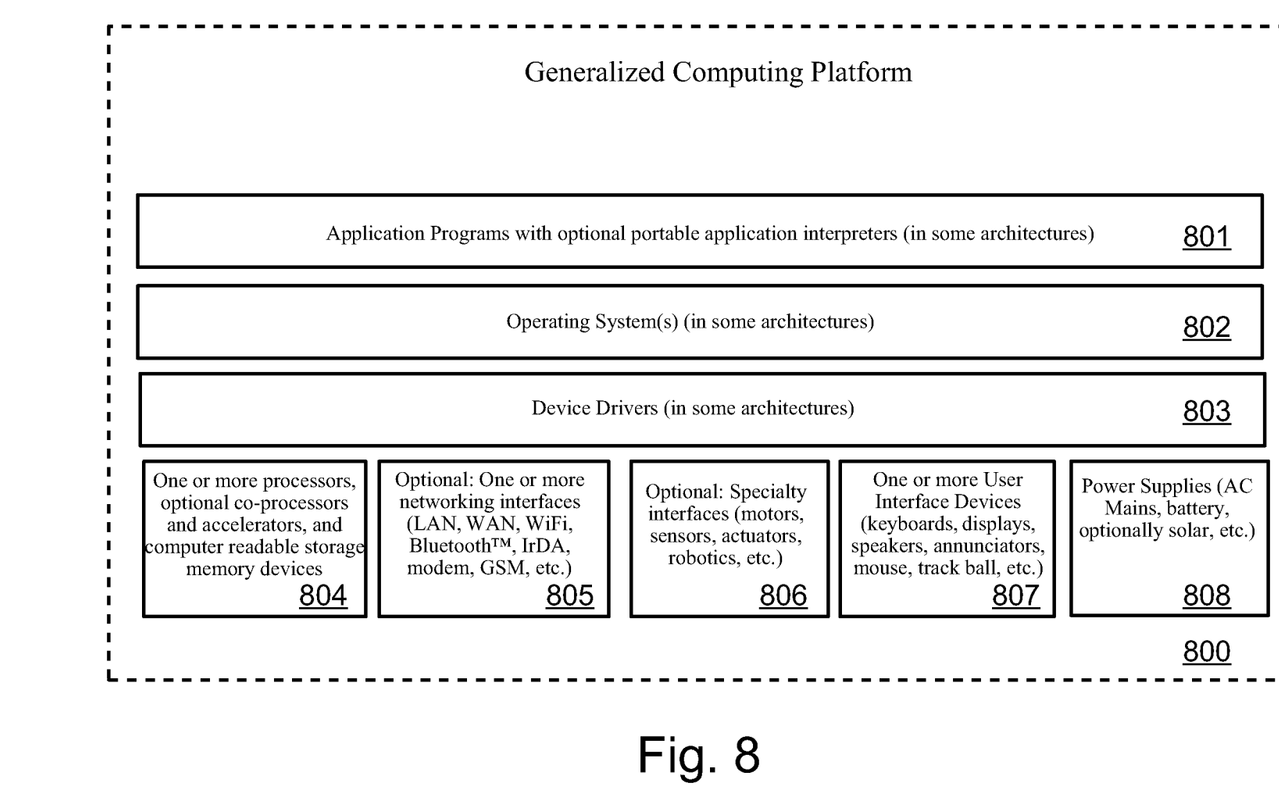
FIG. 8 shows a generalization of a wide range of computing platforms suitable for inclusion into many embodiments of the present invention.

The present invention may be realized for many different processors used in many different computing platforms. FIG. 8 illustrates a generalized computing platform (800), such as common and well-known computing platforms such as "Personal Computers", web servers such as an IBM iSeries™ server, and portable devices such as personal digital assistants and smart phones, running a popular operating systems (802) such as Microsoft™ Windows™ or IBM™ AIX™, Palm OS™, Microsoft Windows Mobile™, UNIX, LINUX, Google Android™, Apple iPhone iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (801) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (804) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (805) may be provided, as well as specialty interfaces for specific applications. If the computing platform is intended to interact with human users, it is provided with one or more user interface devices (807), such as display(s), keyboards, pointing devices, speakers, etc. And, each computing platform requires one or more power supplies (battery, AC mains, solar, etc.).

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for efficient routing comprising:
   in an application layer of multi-layered systems interconnect stack in a routing computer at an intermediary network point, wherein the routing computer comprises a device selected from the group consisting of an edge of network Internet Protocol switch and a content-based router:
      subsequent to authentication of a user, retrieving by the routing computer new session information from a directory;
      caching by the routing computer the new session information associated with an application connection between an application client device and an application server computer;
      providing the application client device a first unique key, wherein the first unique key provides an index into the cache to the cached information for the new session;
      responsive to receipt of a session request from the application client device, indexing by the routing computer into the cached information according to the first unique key to retrieve session routing criteria without performing a look-up operation from another device; and
      subsequent to the caching and indexing, routing by the routing computer according to the retrieved session routing criteria the session request between the associated application client device and the application server computer, wherein the routing is bypassed on a pre-established application connection with known routing information, and wherein the routing computer and the application server computer are separate devices.

2. The method as set forth in claim 1 further comprising using by the routing computer a second key to retrieve the application-specific information responsive to a condition selected from the group consisting of the first key not being provided in an application connection request, the cached application-specific information being corrupted or deleted, and the context of the application session being lost.

3. The method as set forth in claim 2 wherein the second key is opaque and is encrypted and decrypted by a single key source.

4. The method as set forth in claim 1 wherein the application layer of multi-layered systems interconnect stack is compliant with layer seven of an Open Systems Interconnection model.

5. The method as set forth in claim 1 wherein the application client device comprises a browser device.

6. The method as set forth in claim 5 wherein the first key comprises a cookie.

7. A computer readable storage memory device for efficient routing comprising:
   one or more computer-readable storage memory devices;
   program instructions stored by the one or more computer-readable storage memory devices for causing a processor to, in an application layer of multi-layered systems interconnect stack in a routing computer at an intermediary network point, wherein the routing computer comprises a device selected from the group consisting of an edge of network Internet Protocol switch and a content-based router:

subsequent to authentication of a user, retrieve by the routing computer new session information from a directory;

cache by the routing computer the new session information associated with an application connection between an application client device and an application server computer;

provide the application client device a first unique key, wherein the first unique key provides an index into the cache to the cached information for the new session;

responsive to receipt of a session request from the application client device, index by the routing computer into the cached information according to the first unique key to retrieve session routing criteria without performing a look-up operation from another device; and subsequent to the caching and indexing, route by the routing computer according to the retrieved session routing criteria the session request between the associated application client device and the application server computer, wherein the routing is bypassed on a pre-established application connection with known routing information, and wherein the routing computer and the application server computer are separate devices.

8. The computer readable storage memory device as set forth in claim 7 wherein the program instructions further comprise comprising instructions to use a second key to retrieve the application-specific information responsive to a condition selected from the group consisting of the first key not being provided in an application connection request, the cached application-specific information being corrupted or deleted, and the context of the application session being lost.

9. The computer readable storage memory device as set forth in claim 8 wherein the second key is opaque and is encrypted and decrypted by a single key source.

10. The computer readable storage memory device as set forth in claim 7 wherein the application layer of the multi-layered systems interconnect stack is compliant with layer seven of an Open Systems Interconnection model.

11. The computer readable storage memory device as set forth in claim 7 wherein the application client device comprises a browser device.

12. The computer readable storage memory device as set forth in claim 7 wherein the first key comprises a cookie.

13. A system for efficient routing comprising:

a routing computer disposed at an intermediary network point having a logical process according to a multi-layered systems interconnect stack, wherein the routing computer comprises a device selected from the group consisting of an edge of network Internet Protocol switch and a content-based router, wherein the routing computer comprises a processor and one or more computer-readable storage memory devices;

program instructions stored by the one or more computer-readable storage memory devices for causing the processor to, in an application layer of the multi-layered systems interconnect stack:

subsequent to authentication of a user, retrieve by the routing computer new session information from a directory;

cache by the routing computer the new session information associated with an application connection between an application client device and an application server computer;

provide the application client device a first unique key, wherein the first unique key provides an index into the cache to the cached information for the new session;

responsive to receipt of a session request from the application client device, index by the routing computer into the cached information according to the first unique key to retrieve session routing criteria without performing a look-up operation from another device; and subsequent to the caching and indexing, route by the routing computer according to the retrieved session routing criteria the session request between the associated application client device and the application server computer, wherein the routing is bypassed on a pre-established application connection with known routing information, and wherein the routing computer and the application server computer are separate devices.

14. The system as set forth in claim 13 further comprising a second key value disposed in the computer readable memory of the router device for retrieving the application-specific information responsive to a condition selected from the group consisting of the first key not being provided in an application connection request, the cached application-specific information being corrupted or deleted, and the context of the application session being lost.

* * * * *